United States Patent
Ng et al.

(10) Patent No.: US 7,695,138 B2
(45) Date of Patent: Apr. 13, 2010

(54) SAFE EYE DETECTION

(75) Inventors: Kee Yean Ng, Prai (MY); Julie Fouquet, Portola Valley, CA (US); John Stewart Wenstrand, Menlo Park, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/194,482

(22) Filed: Aug. 19, 2008

(65) Prior Publication Data

US 2008/0304011 A1    Dec. 11, 2008

Related U.S. Application Data

(62) Division of application No. 11/095,959, filed on Mar. 31, 2005, now Pat. No. 7,430,365.

(51) Int. Cl.
*A61B 3/14* (2006.01)
*A61B 3/10* (2006.01)
(52) U.S. Cl. ..................... 351/206; 351/221
(58) Field of Classification Search ......... 351/205–206, 351/208–210, 221
See application file for complete search history.

(56) References Cited

U.S. PATENT DOCUMENTS 5,598,145 A * 1/1997 Shimotani et al. ........... 340/576
5,790,234 A   8/1998 Matsuyama
7,091,471 B2  8/2006 Wenstrand et al.

OTHER PUBLICATIONS

Fouquet, J. E., "A Simple Optical Appraoch to Pupil Detection", *IEEE Computer Vision and Pattern Recognition Conference*, (Jun. 30, 2004),3.

* cited by examiner

*Primary Examiner*—Scott J Sugarman
*Assistant Examiner*—Dawayne A Pinkney

(57) ABSTRACT

An eye detection system for safe detection of the eye positions of a subject estimates the distance from the eye detection system to the subject and reduces the power level of at least one primary light source of the eye detection system if the subject is too close to the eye detection system. If the subject is not too close to the eye detection system, the power level of the at least one primary light source of the eye detection system is increased, provided the power level is below a predetermined maximum power level. Primary light from the at least one primary light source reflected from the subject is sensed by an imager to obtain one or more images, from which the eye positions of the subject are estimated.

7 Claims, 6 Drawing Sheets

SAFE EYE DETECTION

CROSS-REFERENCE TO RELATED APPLICATIONS

This is a divisional of copending application Ser. No. 11/095,959, filed on Mar. 31, 2005, the entire disclosure of which is incorporated into this application by reference.

FIELD

This invention relates generally to the field of eye detection. More particularly, this invention relates to a method and apparatus for safe detection of eye position and gaze direction.

BACKGROUND

Eye detection systems based on an analysis of epipolar stereo images of the face have achieved a high degree of precision in reporting human eye location and gaze direction. A simple optical approach to implement this system is to use infrared (IR) light to illuminate the eyes. Light reflected off the inner posterior surface of the eye and is detected by an imager. Two sets of images are seen by an imager by using two sets of IR sources. The sources may be separated in time or have different wavelengths and the images may be separated by time-gating or wavelength filtering. These images can be processed digitally to yield bright circles indicative of pupil location.

A disadvantage of this approach is that is cannot be used when the subject is not close to the light source and imager. This is because more powerful IR light sources must be used. Such light sources pose a safety risk if the subject moves too close to the light source and gazes directly into them. Prolonged exposure to such high power signals could damage the eye. For example, if the system is designed to be safe at distances greater than 12 cm, then the approach does not work if the subject is more than 2 m away from the detector, as is the case for a television implementation for example.

Another approach uses a telephoto lens, passive illumination and conventional image processing, but this approach only works with appropriate ambient lighting and does not work through sunglasses. In addition, this requires substantial computational resources to locate an eye.

SUMMARY

The present invention relates generally to safe detection of eye positions. Objects and features of the invention will become apparent to those of ordinary skill in the art upon consideration of the following detailed description of the invention.

In one embodiment of the invention, an eye detection system for safe detection of the eye positions of a subject estimates the distance from the eye detection system to the subject and reduces the power level of at least one primary light source of the eye detection system if the subject is too close to the eye detection system. If the subject is not too close to the eye detection system, the power level of the at least one primary light source of the eye detection system is increased, provided the power level is below a predetermined maximum power level. Primary light from the at least one primary light source is reflected from the subject and is sensed by an imager to obtain one or more images, from which the eye positions of the subject are estimated.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
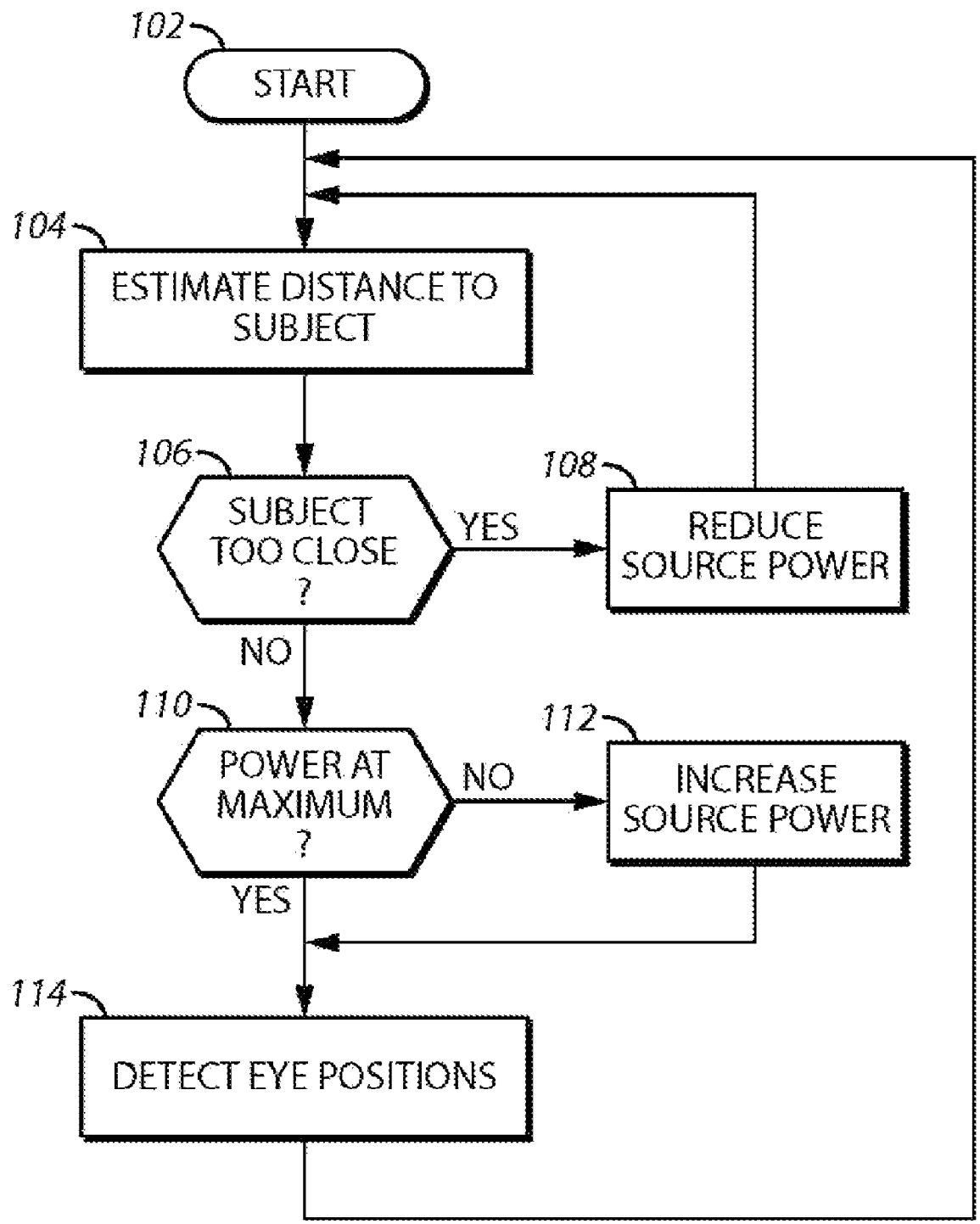
FIG. 1 is a flow chart of a method consistent with an embodiment of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

FIG. 1 is a flow chart of a method consistent with an embodiment of the invention. The flow chart depicts a method for safe operation of an eye detection system that uses infrared (IR) light to illuminate a subject. Referring to FIG. 1, following start block 102, the distance from an IR light source of the eye detection system to a subject is estimated. This may be performed in various ways. In one embodiment of the invention an infrared proximity sensor is used. This sensor may be integrated with the eye detection system. In another embodiment of the invention, an IR light source and an imager of the eye detection system are used as proximity sensor. In a further embodiment, the intensity of the IR light reflected from the subject is measured. In a still further embodiment, the size of the image of the subject's pupils are measured and used to estimate the distance to the subject. Also, in another embodiment the size of an oval face can be measured to estimate distance. It will also be apparent to those of ordinary skill in the art that various approaches to estimating the distance to the subject may be combined to provide greater accuracy or higher reliability.

At decision block 106, a check is made to determine if the subject is too close to the IR light source. This decision may be based upon the current power level of the IR light source and the estimated distance to the subject. If it is determined that the subject is too close, as depicted by the positive branch from decision block 106, the power level of the IR light source is reduced at block 108. The power level of IR light source may be reduced to zero if appropriate for the application. Once the power level has been reduced, flow returns to block 104. If it is determined that the subject is not too close, as depicted by the negative branch from decision block 106, a check is made at decision block 110 to determine of the power level of the IR light source is set at a maximum level. If the power level is not at a maximum, as depicted by the negative branch from decision block 110, the power level is increased at block 112. The power level may be increased in increments or set to the maximum level. If the power level is at a maximum, as depicted by the positive branch from decision block 110, or if the power level has been increased at block 112, flow continues to block 114 and eye detection is performed. A single eye detection measurement may be made, or eye detection may be performed for a predetermined length of time. Flow then returns to block 104.

In this manner, the power level is adjusted dependent upon the distance between the eye detection system and the subject. This prevents a subject from being exposed to unsafe levels of IR light when close to the IR light source of the eye detection system.

Figure 2:
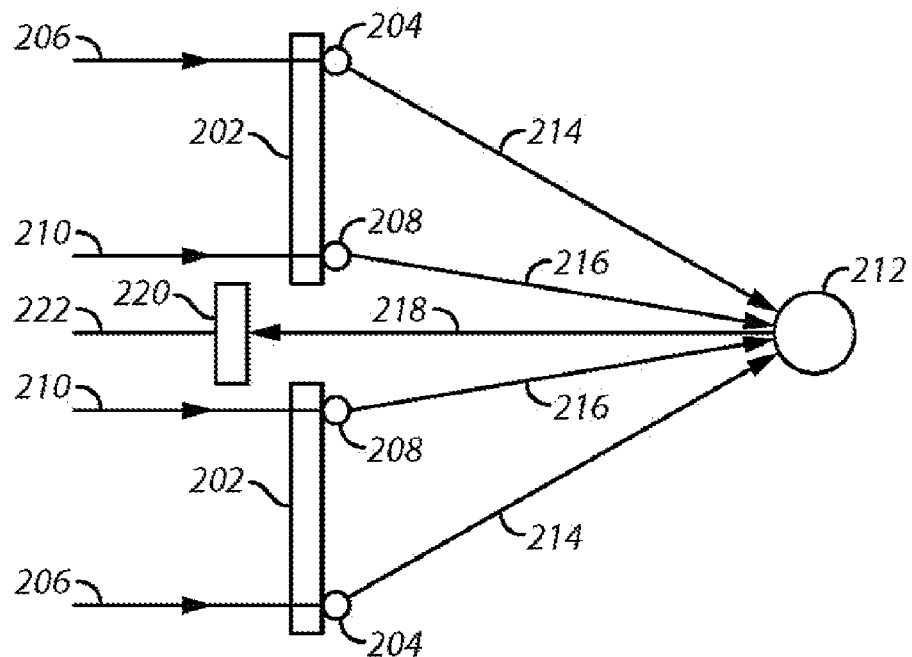
FIG. 2 is a diagrammatic representation of an eye detection system consistent with an embodiment of the invention.

FIG. 2 is a diagrammatic representation of an eye detection system consistent with an embodiment of the invention. In FIG. 2, support structures 202 support first IR light sources 204 driven by first drive signals 206 and second IR light sources 208 driven by second drive signals 210. In this embodiment, the first IR light sources 204 are 'off-axis' light sources and the second IR light sources 208 are 'on-axis' light sources. In one embodiment of the invention, the first and second light sources are light emitting diode (LED) light sources. The light source may emit light of different wavelengths, for example, the first light sources 204 could emit light of 850 nm while the second light sources 208 could emit light of 780 nm, or vice versa. The first light sources 204 emit light along optical path 214 to a subject 212, and the second light sources 208 emit light along optical path 216 to the subject 212. Light from all sources passes through the pupils of the subject 212 and is reflected from the retinas at the back of the eyes along optical path 218 to an imager 220. The imager includes an array of optical sensors, such as photodiodes. In one embodiment, the imager is a silicon detector such as a CMOS optical imager with a mega-pixel array. A large number of pixels in the array increases the sensitivity of the eye detector. Sampled signals from the imager are processed to yield information relating to the eyes of the subject 212. The imager 220 outputs an image signal 222.

Figure 3:
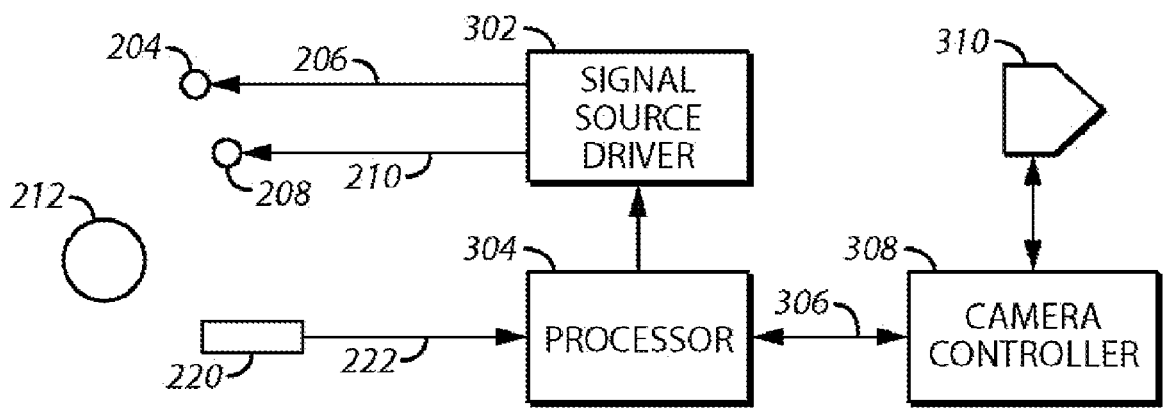
FIG. 3 is a block diagram of an eye detection system consistent with an embodiment of the invention.

FIG. 3 is a block diagram of an eye detection system consistent with an embodiment of the invention. Referring to FIG. 3, the eye detection system includes a signal source driver 302 that generates the first drive signal(s) 206 to the first source(s) 204 and the second drive signal(s) 210 to the second source(s) 208. The signal source driver 302 may control the output of an IR light source by modifying the amplitude of the drive signal or by varying the pulse-width of pulse width modulated signal. The output of the light source may be controlled to ensure that light reflected from a subject 212 is in a desired range. A processor 304, such as a digital signal processor, controls the signal source driver 302 to control the levels of the signals 206 and 210 in response to the image signal 222 received from the imager 220. For example, the sources 204 and 208 can be used together with the imager 220 as a proximity sensor to estimate the distance of the subject 212 from the sources 204 and 208. Alternatively, the intensity of the light reflected from the subjects' retinas may be measured, or the size of the retinal images may be measured, or the size of the face can be measured. The intensity of the reflected light increases at the subject moves closer to the eye detection system and so provides an estimate of the proximity of the subject. Also, the size of the retinal images increases at the subject moves closer to the eye detection system, so this also provides an estimate of the proximity of the subject. As an additional check, the spacing of the two retinal images may be measured. A large spacing indicates that the subject is close to the eye detector. However, a small spacing may not indicate that the subject is far away. Processor 304 receives and analyzes the signal 222 from the imager to perform eye detection and to estimate the proximity of the subject. Eye detection information 306 may be used to control a variety of systems. For example, as shown in FIG. 3, the eye detection information 306 may be passed to a camera controller 308 that controls the pan, tilt and zoom of a camera 310. One application for such a system is for face recognition. The pan, tilt and zoom of the camera can be used to place the image at a preferred position in the image frame and to ensure the optimal magnification of the image. This reduces the amount of post-processing required to analyze the image and ensures maximum image quality.

Figure 4:
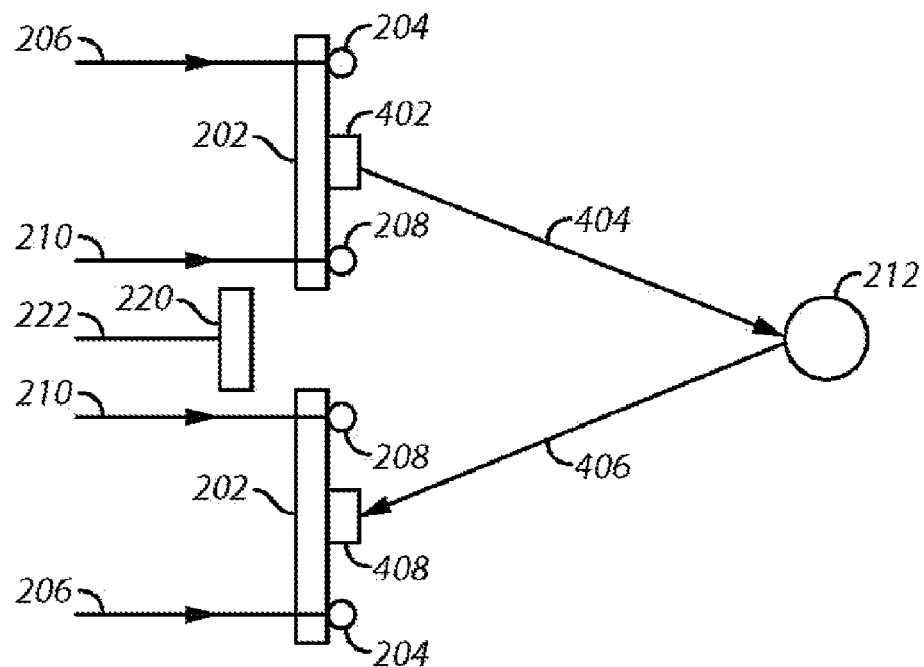
FIG. 4 is a diagrammatic representation of an eye detection system consistent with a further embodiment of the invention.

FIG. 4 is a diagrammatic representation of an eye detection system consistent with a further embodiment of the invention. In FIG. 4, one of the support structures 202 supports a signal emitter 402. Light from the signal emitter 402 passes along signal path 404. If a subject 212, or other object, is close to the eye detection system, the signal is reflected from the subject along signal path 406 to a signal detector 408. The signal emitter 402 may be an IR light source, such as an LED for example, in which case the wavelength of the IR light is chosen to be different to that emitted by IR light sources 204 and 208. The signal detector 408 may be a PIN (positive-intrinsic-negative) photodiode. When a signal reflected from the subject 212 is detected at the signal detector 408, the IR light sources may be switched off or operated at reduced power level.

Figure 5:
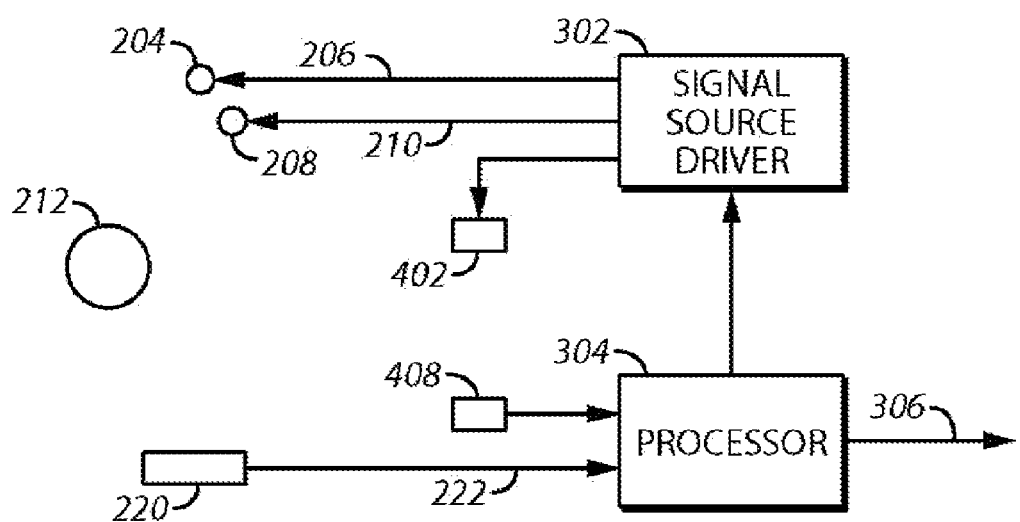
FIG. 5 is a block diagram of an eye detection system consistent with a further embodiment of the invention.
Figure 6:
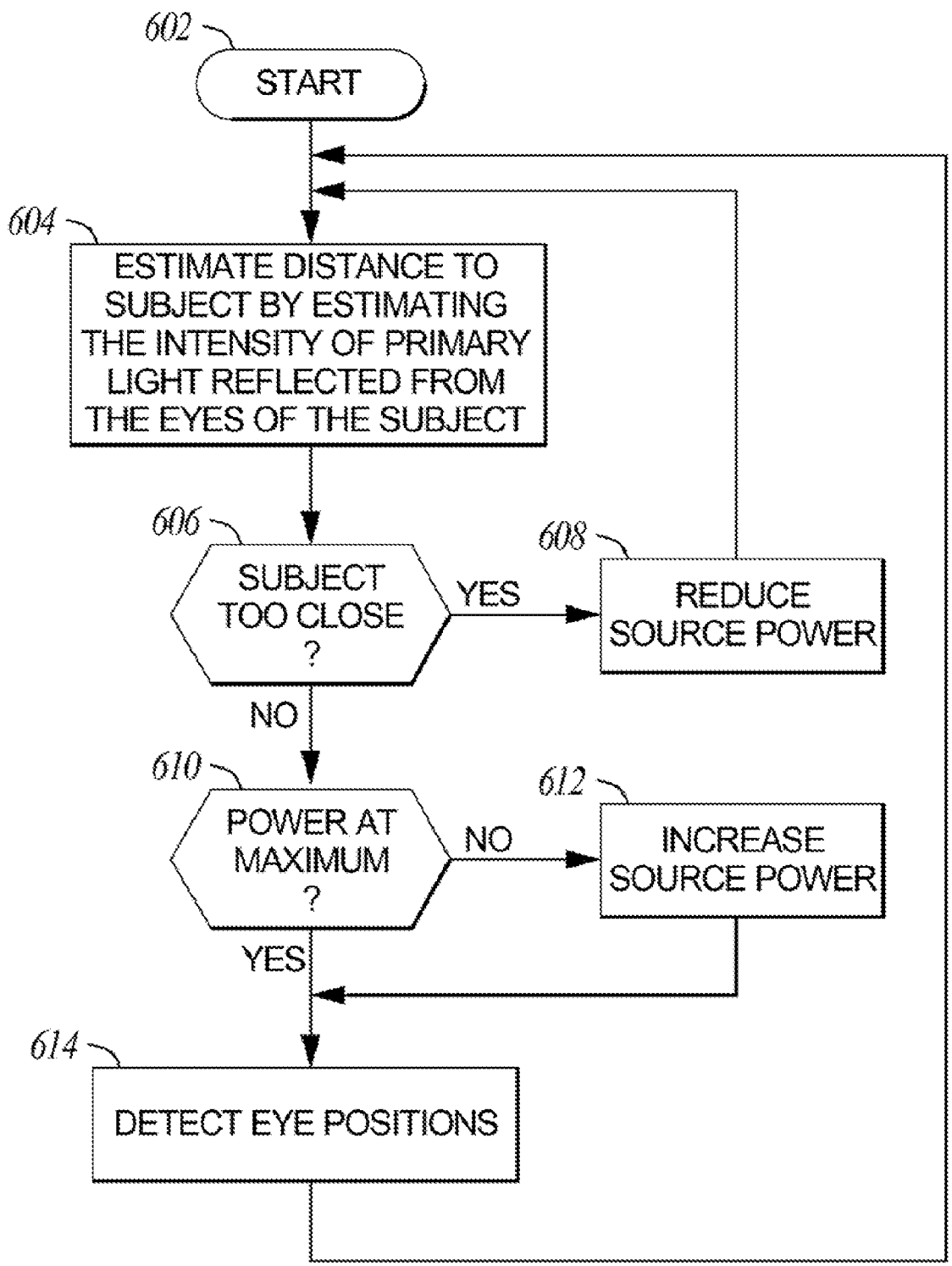
FIG. 6 is a flow chart of a method consistent with a further embodiment of the invention.
Figure 7:
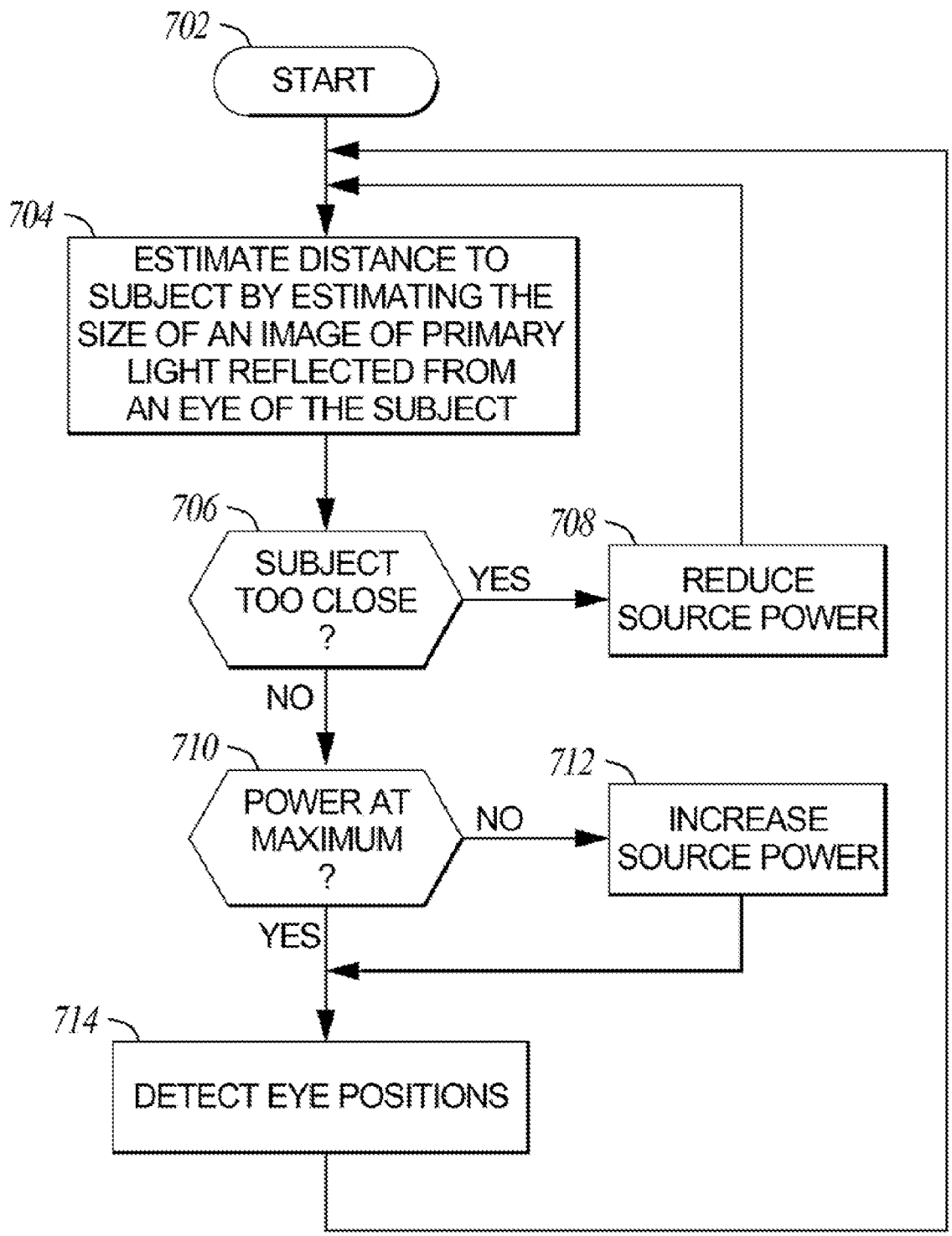
FIG. 7 is a flow chart of a method consistent with a further embodiment of the invention.
Figure 8:
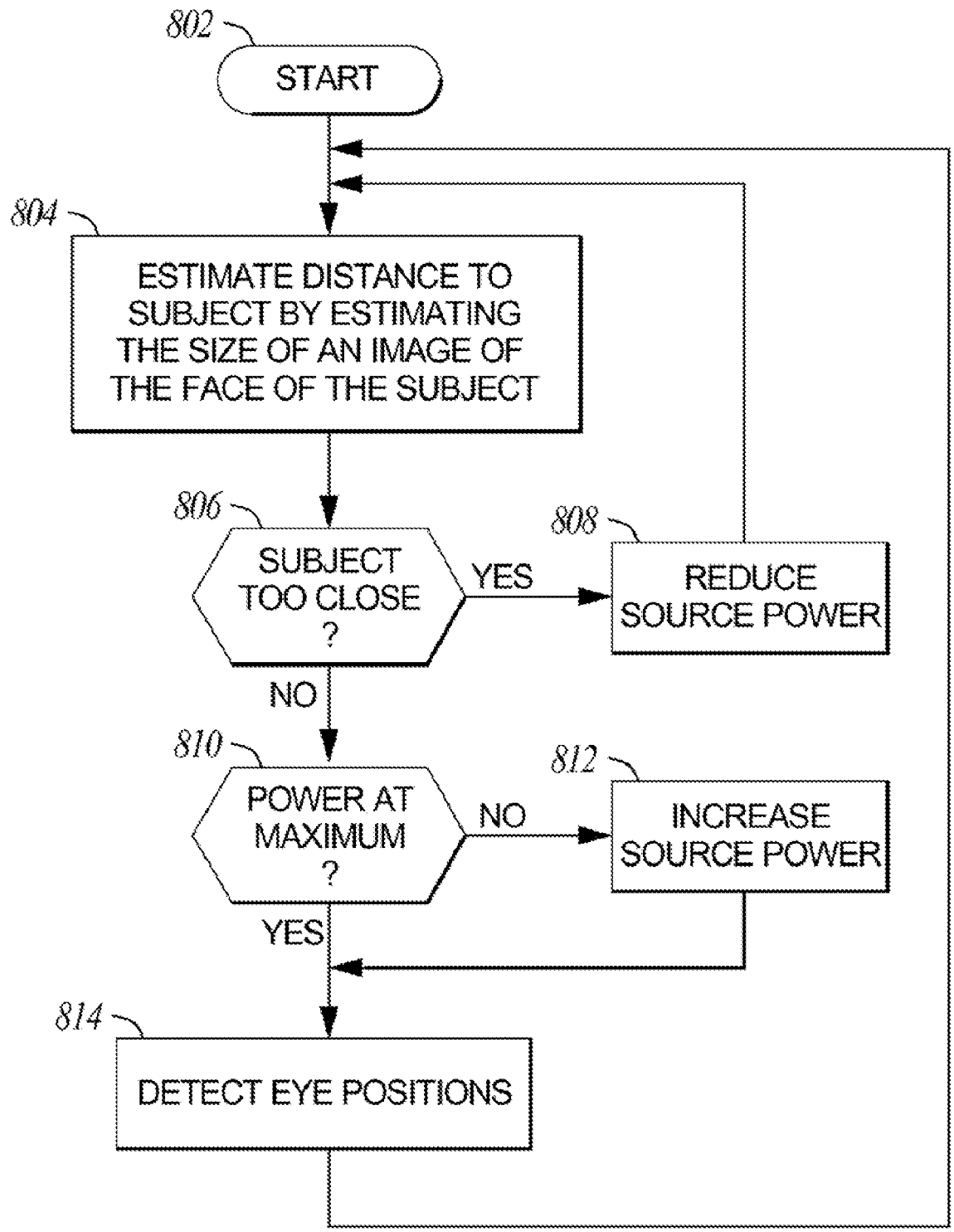
FIG. 8 is a flow chart of a method consistent with a further embodiment of the invention.

FIG. 5 is a block diagram of an eye detection system consistent with the further embodiment of the invention. In addition to the IR light sources 204 and 208 and the imager 220 used for eye detection, the system includes the signal emitter 402 and signal detector 408 used for subject proximity sensing. The signal emitter 402 emits a signal that is reflected from a subject 212 and received by the signal detector 408. A processor 304 controls the signal source driver 302 to control the levels of the signals 206 and 210 in response to the image signal 222 received from the imager 220. The signal emitter 402 and signal detector 408 may be positioned relative to each other to prevent the signal from the emitter arriving at the detector via a direct path. The processor 304 also controls the signal source driver 302 to control the signal used to drive the signal emitter 402. The processor 304 receives and analyzes the signal 222 from the imager to perform eye detection and also receives the signal from the signal detector 408 to estimate the proximity of the subject. The IR light sources may be switched off or operated at a reduced power level if a subject is detected too close to the IR light sources.

The eye detection system may be used to provide information to a variety of systems. These include cameras that track the face of a subject, optical displays that may be dimmed or switched off to save power when no watching eyes are detected, optical displays that control the orientation of a displayed image to match the orientation of the viewer, computer interfaces that navigate around a display screen to select an object viewed by a user, and other gaze-controlled targeting systems.

Those of ordinary skill in the art will recognize that the present invention has been described in terms of exemplary embodiments. However, the invention should not be so limited, since the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, ASICS, dedicated hard wired logic and/or programmable gate arrays may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of operation of an eye detection system for safe detection of the eye positions of a subject, the method comprising:

estimating the distance from the eye detection system to the subject;

if the subject is too close to the eye detection system:
      reducing the power level of at least one primary light source of the eye detection system;

if the subject is not too close to the eye detection system:
      increasing the power level of the at least one primary light source of the eye detection system provided the power level is below a predetermined maximum power level;

sensing primary light from the at least one primary light source reflected from the subject to obtain at least one image; and detecting the eye positions of the subject dependent upon the at least one image, wherein estimating the distance from the eye detection system to the subject comprises one of:
      processing the at least one image to estimate the intensity of primary light reflected from the eyes of the subject;
      processing the at least one image to estimate the size of an image of primary light reflected from an eye of the subject; and
      processing the at least one image to estimate the size of an image of the face of the subject.

2. A method in accordance with claim 1, wherein estimating the distance from the eye detection system to the subject comprises processing the at least one image to estimate the intensity of primary light reflected from the eyes of the subject.

3. A method in accordance with claim 1, wherein estimating the distance from the eye detection system to the subject comprises processing the at least one image to estimate the size of an image of primary light reflected from an eye of the subject.

4. A method in accordance with claim 1, wherein estimating the distance from the eye detection system to the subject comprises processing the at least one image to estimate the size of an image of the face of the subject.

5. An eye detection system for safe detection of the eye positions of a subject, the apparatus comprising:

at least one primary light source operable to emit primary light;

an imager operable to sense primary light reflected from the subject and generate images therefrom;

a signal source driver operable to provide drive signals to the at least one primary light source; and a processor operable to process the images to detect the eye positions of the subject;

wherein the processor is further operable to estimate the proximity of the subject to the eye detection system and to control the signal source driver to adjust the drive signals to the at least one primary light source dependent upon the proximity of the subject to the eye detection system, wherein the processor is operable to estimate the proximity of the subject to the eye detection system by one of:
      processing an image generated by the imager to estimate the size of an image of primary light reflected from an eye of the subject; and
      processing an image generated by the imager to estimate the intensity of primary light reflected from an eye of the subject.

6. An eye detection system in accordance with claim 5, wherein the processor is operable to estimate the proximity of the subject to the eye detection system by processing an image generated by the imager to estimate the size of an image of primary light reflected from an eye of the subject.

7. An eye detection system in accordance with claim 5, wherein the processor is operable to estimate the proximity of the subject to the eye detection system by processing an image generated by the imager to estimate the intensity of primary light reflected from an eye of the subject.

* * * * *